May 22, 1956     H. J. VAN DOORNE     2,746,586
TRACTOR FOR TOWING ORDNANCE OR OTHER HEAVY VEHICLES
Filed Jan. 21, 1953     6 Sheets-Sheet 1

INVENTOR.
Hubertus Josephus Van Doorne,
BY Wenderoth, Lind & Ponack

ATTYS.

May 22, 1956 H. J. VAN DOORNE 2,746,586
TRACTOR FOR TOWING ORDNANCE OR OTHER HEAVY VEHICLES
Filed Jan. 21, 1953 6 Sheets-Sheet 2

INVENTOR.
Hubertus Josephus Van Doorne
BY Wenderoth, Lind and Ponack

ATTYS.

May 22, 1956 H. J. VAN DOORNE 2,746,586
TRACTOR FOR TOWING ORDNANCE OR OTHER HEAVY VEHICLES
Filed Jan. 21, 1953 6 Sheets-Sheet 3

INVENTOR.
Hubertus Josephus Van Doorne,
BY Wenderoth, Lind and Ponack
ATTYS.

May 22, 1956  H. J. VAN DOORNE  2,746,586
TRACTOR FOR TOWING ORDNANCE OR OTHER HEAVY VEHICLES
Filed Jan. 21, 1953  6 Sheets-Sheet 4

INVENTOR
HUBERTUS JOSEPHUS VAN DOORNE

BY
ATTORNEYS

United States Patent Office 2,746,586
Patented May 22, 1956

---

2,746,586

TRACTOR FOR TOWING ORDNANCE OR OTHER HEAVY VEHICLES

Hubertus Josephus van Doorne, Deurne, Netherlands

Application January 21, 1953, Serial No. 332,207

Claims priority, application France January 28, 1952

3 Claims. (Cl. 192—99)

This invention relates to a tractor for towing ordnance or other heavy vehicles, including a towing hook connected to a winch cable and a winch adapted to be driven by a clutch provided with a releasable coupling. A spring-loaded pawl is provided and adapted to lock the towing hook in its place on the tractor. Actuating means are used for releasing the pawl and a catch to hold the pawl in its released position. There is a second actuating means for engaging the winch-drive, and a device which is actuated by the towing hook when it arrives in its place on the tractor in such a way that the catch releases the pawl so that the pawl locks the towing hook again and disengages the winch drive. A tractor of this kind is known from my prior U. S. Patent 2,120,637.

The present invention provides a tractor which constitutes an improvement over the tractor described and shown in my prior patent.

A further object of the present invention is to provide a tractor in which the disengagement of the winch drive when the towing hook (draw-hook) arrives in its supporting member on the tractor, is achieved in a more efficient and reliable way.

Still a further object of the invention is to provide a tractor in which resilient means and a device for holding a towing hook pawl in its disengaged position are combined in such a way that a small displacement of a member connected with the pawl is sufficient that the resilient means disengages the winch drive coupling members by shifting one of said coupling members over a substantial distance.

According to the invention the coupling of the winch drive is held in its engaged position against the action of a resilient means by a toggle-mechanism which is connected with the actuating means for engaging the winch drive and is held at one side of its dead center by said resilient means, while the toggle mechanism is also connected with the pawl in such a way that if the pawl locks the towing-hook by the influence of its spring, then the spring moves said toggle-mechanism through its dead center and thereby allows said resilient means to disengage said coupling.

While toggle mechanisms are known per se in various applications, the way of applying it in the actuating means of a tractor according to the invention is useful and new.

According to a further characteristic feature of the invention the toggle mechanism is connected with the actuating means for releasing the catch of the towing hook by means of a lost-motion device which is arranged in such a way that actuating the actuating means is without influence for moving the toggle-mechanism through its dead center.

A tractor is known in which the clutch comprises two coupling members which are urged into engaged position by a coupling spring and further comprising an actuating means for one of said coupling members. If this arrangement is used on the tractor according to the invention, the actuating means may, according to the further characteristic feature of the invention comprise a shaft by which the force of the resilient means acting on the coupling is transmitted to the toggle-mechanism in order to hold said toggle-mechanism at one side or at the other side of its dead center.

According to a further feature of the invention, the resilient means acting on the toggle-mechanism consists on the one hand of said coupling spring which bears against a movable coupling member and against a coupling disc which is axially displaceable relative to said coupling member, and on the other hand of a coupling disengaging spring which bears against the housing of the clutch and which pushes against said coupling disc in the same direction as said coupling spring. This arrangement makes it possible to use a coupling spring of great force but of a relatively small expansion and a coupling disengaging spring of small force but of an expansion which is sufficient to displace one of the coupling members sufficiently far so that its teeth, dogs, or the like disengage the corresponding teeth, dogs, or the like of the other coupling members.

According to still a further feature of the invention the axial displacement of the coupling disc relative to the movable coupling member is limited by an abutment which is fixedly connected to the coupling member, while in the engaged position of the coupling members said coupling disc is held by said actuating means in a position in which the coupling disc is free from said abutment. The coupling spring needs only to hold the coupling members engaged with a sufficient force and needs only to extend so far that the coupling disc or a member connected therewith comes into contact with the abutment. As soon as the toggle-mechanism has passed its dead center, the coupling disengaging spring, which does not need to be stronger than to disengage the coupling members and to hold said coupling members in said disengaged position, takes effect and consequently the pressure of the actuating means on the coupling disc is released.

The drawings show in Figs. 1 to 6 a tractor as known from the above mentioned U. S. Patent No. 2,120,637 and for which the improvement of the automatic way for engaging and disengaging the winch-drive is intended. The novel means is shown in Figs. 7 to 12.

Fig. 12 is a view of an alternative construction of some parts shown in Fig. 9.

Figure 1:
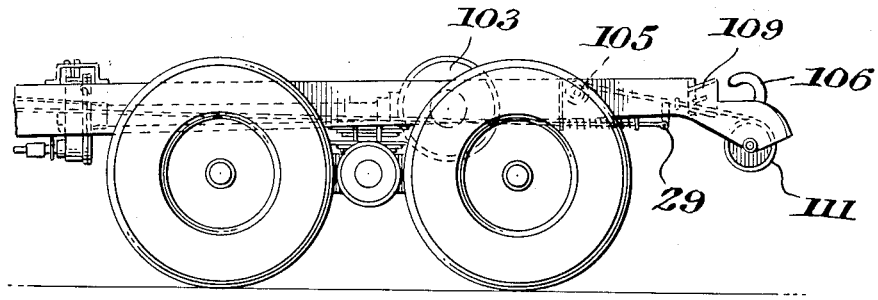
Fig. 1 is a side elevation of the rear portion of the known tractor.
Figure 2:
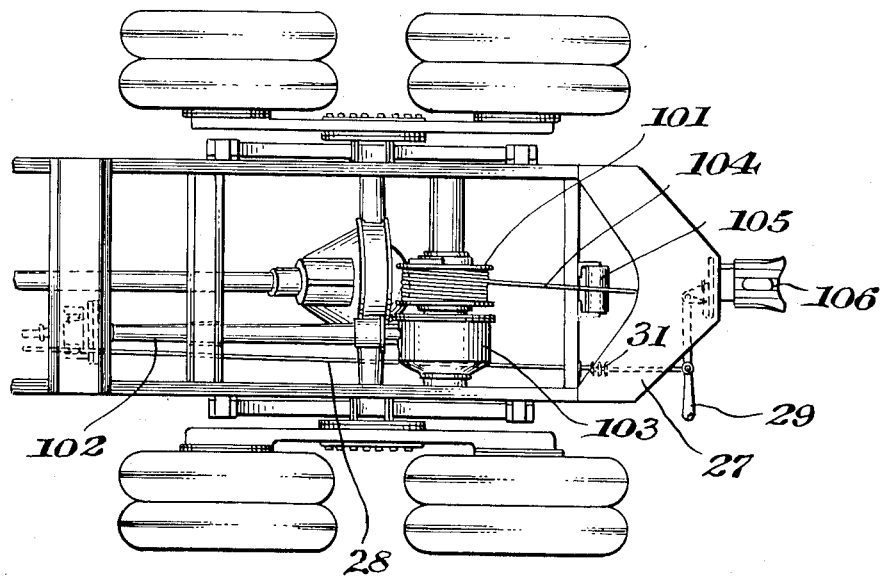
Fig. 2 is a corresponding top view.
Figure 3:
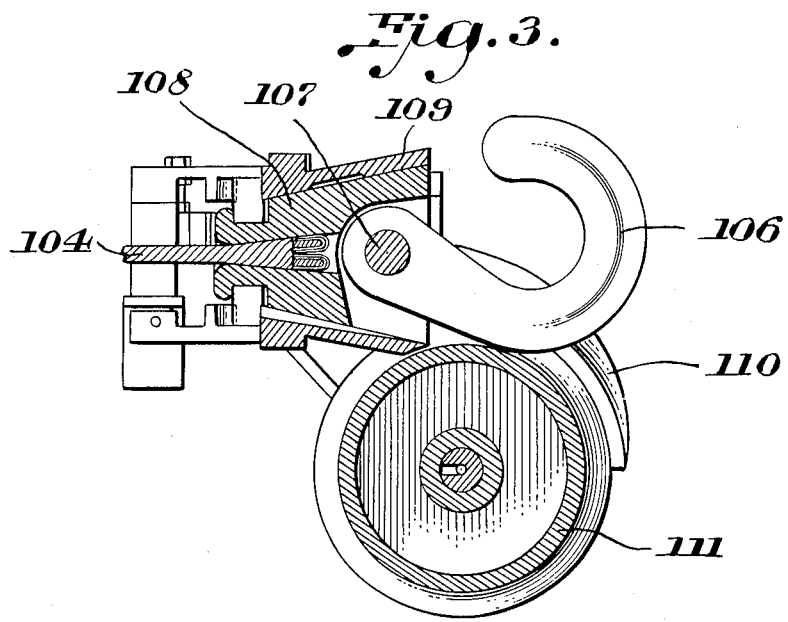
Fig. 3 is a section through the hook and adjacent parts of the tractor on an enlarged scale.
Figure 4:
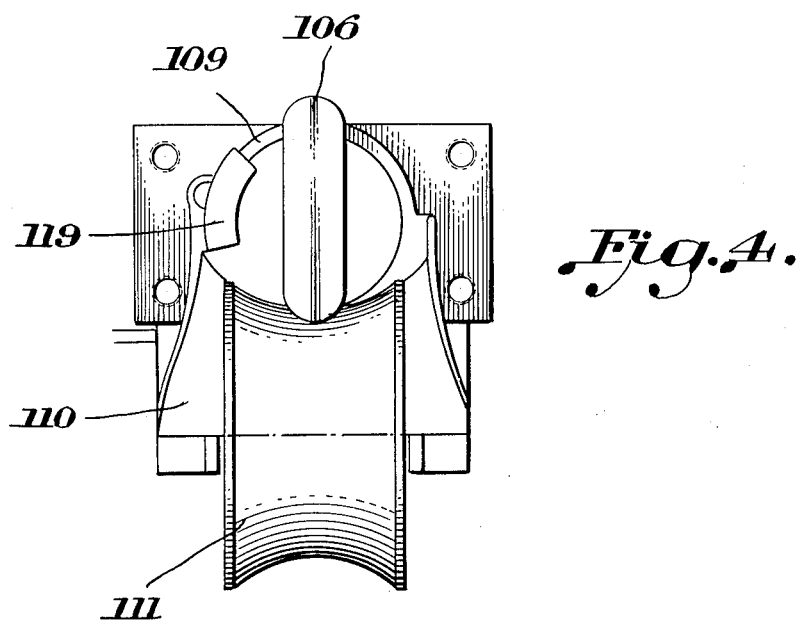
Fig. 4 is a rear view of the parts shown in Fig. 3 partly in section.

The rear part of the tractor shown in Figs. 1 and 2 is provided with a winch 101 which is driven by the engine of the tractor (not shown) by means of a clutch 1, a shaft 102, and reduction gears 103. The winch cable 104 is guided by a pulley 105 and is provided at its end with a towing hook 106. This towing hook consists of two parts, the hook proper 106 and a conical part 108 which is pivotally connected to hook 106 by means of a bolt 107. The winch cable 104 is secured to the conical part 108 by splicing around which metal has been poured.

The towing hook fits with its conical part 108 in a correspondingly shaped member 109 which is fixed to the frame of the tractor and carries, between two wings 110 a guiding pulley 111. This pulley guides the cable when the same is unreeled and when the ordnance or the like is pulled to the tractor.

Figure 5:
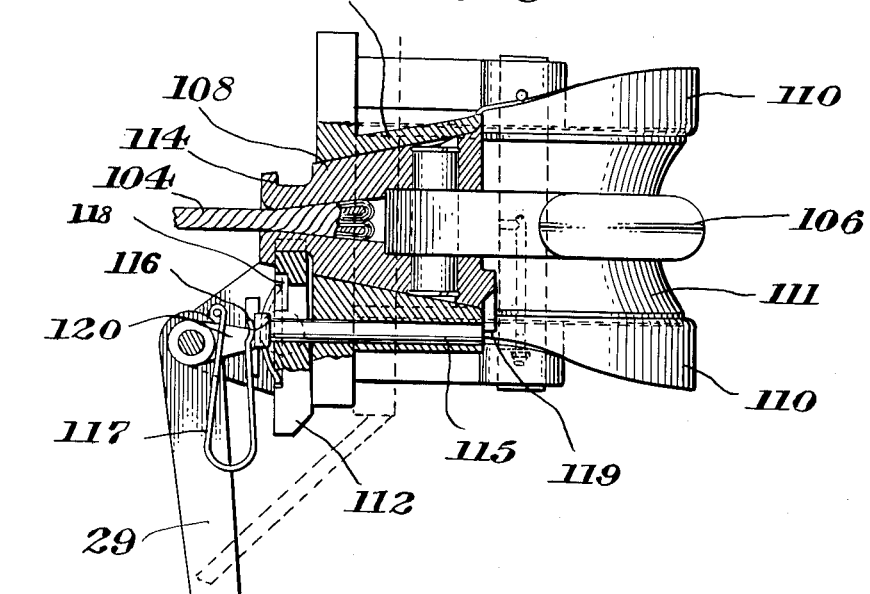
Fig. 5 is a top view of the parts shown in Fig. 3, partly in section.
Figure 6:
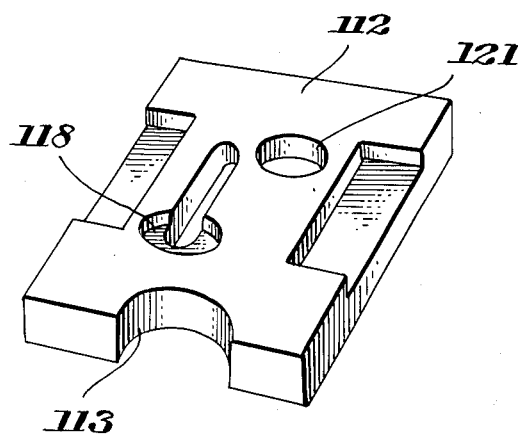
Fig. 6 is a perspective view of the pawl for locking the towing hook.

If the cable is reeled and the conical part 108 of the towing hook arrives in its place in the member 109, the towing hook is locked in this position by means of a pawl 112 (Figs. 5 and 6). Said pawl engages with its edge 113 a circular groove 114 of the conical part 108. If the pawl 112 is in its position in which it locks the towing hook, said pawl is automatically locked by a mechanism which operates in the following way.

The cable 104 being unreeled, and the pawl 112 being disengaged, the latter is held in this position by means of a pin 115 slidable in the member 109, the head 116 of which is maintained by a spring 117 in a circular recess 118 of the pawl 112.

When reeling the winch cable the conical part 108 of the towing hook arrives in the correspondingly shaped member 109 and a projection 119 of the conical part 108 shifts the pin 115 against the action of the spring 117 till the head 116 leaves the circular recess 118 of the pawl. Said pawl is no longer locked and may be shifted by means of a lever 29 which with a ball-shaped head of an arm 120 engages an opening 121 of the pawl 112. The lever 29 is adapted to be swung by a rod 28 which by means of a spring 27 is urged towards the rear side of the tractor, said spring bearing against a fixed part 30 of the vehicle frame and against a collar 31 of the rod 28.

If thus the head 116 of the pin 115 releases the pawl 112, said spring 27 swings the lever 29 in such a way that the pawl 112 engages the circular groove 114 of the towing hook by means of its recess 113.

If it is desired to unreel the cable 104, the lever 29 is pulled towards the front of the vehicle in a way to be described herein below, so that the head of the arm 120 shifts the pawl 112 so that the latter leaves the circular groove 114 of the conical part 108 of the hook 106 and thereby the hook is unlocked. As soon as the towing hook leaves its supporting member 109 its projection 119 releases the pin 115 so that its head 116 may snap into the circular recess 118 of the pawl under the influence of the spring 117 and the pawl is locked in its disengaged position.

The purpose of the invention is to provide a mechanism which assures the immediate disengagement of the winch drive as soon as the towing hook 106 arrives in its supporting member 109 in order to prevent too great a stress of the cable and consequently of all the associated parts of the winch drive. In order to attain this the device according to the invention is executed in the following way.

Figure 7:
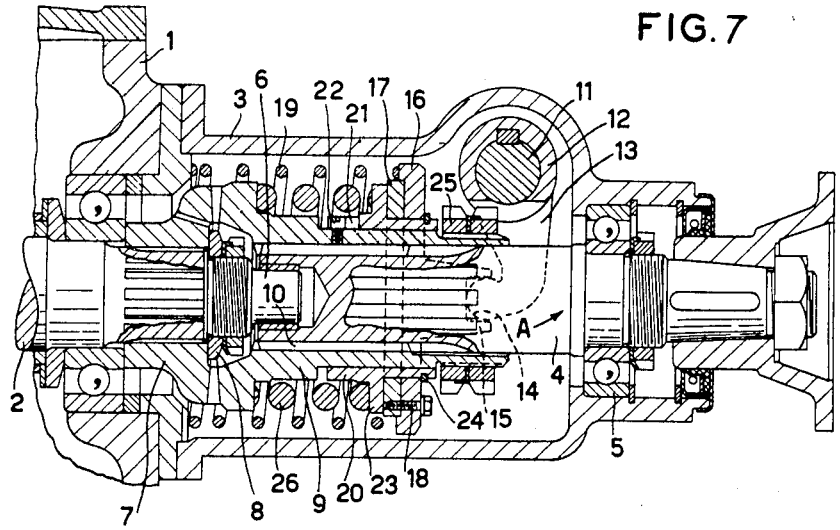
Fig. 7 is a longitudinal section of a part of the clutch of the arrangement according to the invention, in its engaged position.
Figure 8:
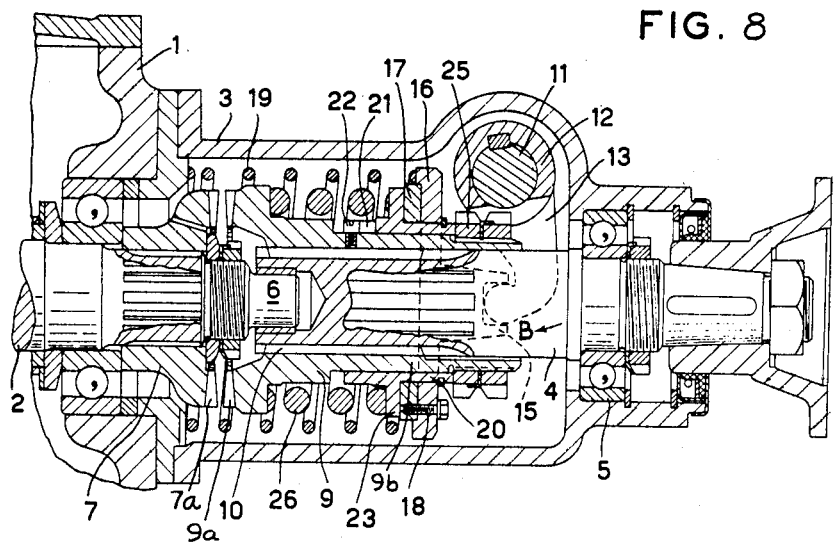
Fig. 8 is a corresponding section, however, in its disengaged position.

The housing 1 shown in Figs. 7 and 8 comprises a drive shaft 2 which extends into a second housing 3 which is fixed to the housing 1 in any suitable manner.

A driven shaft 4 is supported at one end by a ball bearing in the housing 3 and at the other end by a projection 6 on the drive shaft 2, shaft 4 connects with shaft 102 which in turn drives winch 101 through reduction gears 103. A coupling member 7 is secured on the shaft 2 by means of nuts 8 and is provided with teeth or dogs 7a which are adapted to engage teeth or dogs 9a of a second coupling member 9. The coupling member 9 which has a hub-shaped elongation, is adapted to slide along splines 10 on the shaft 4.

The housing 3 supports a cross shaft 11 which is provided with an operating member 12 shaped as a fork with two legs 13, each of which is provided with a rounded head 14. The heads 14 of the fork 13 bear in recesses 15 which are arranged in a coupling disc 16 at both sides of the shaft 4. An anti-friction disc 17 is fixed by means of screws 18 to the coupling disc 16.

A coupling disengaging spring 19 is arranged between a fixed portion of the housing 3 and the coupling disc 16. A sleeve 20 is rotatable within the coupling disc 16 and the anti-friction disc 17. This sleeve 20 is adapted to slide along the hub 9b of the coupling member 9. The sleeve 20 is provided with a slot 21 while a pin member 22 is screwed into the hub of the member 9 so that the sleeve 20 follows the rotation of the hub of the member 9 and, when being axially displaced, is guided by the pin 22. The coupling disc 16 and the anti-friction disc 17 are, in axial direction, enclosed between a flange 23 of the sleeve 20 and a resilient snapring 24 arranged in a circular groove of the sleeve. Two nuts 25 form an abutment for limiting the axial displacement of the sleeve 20 along the hub of the member 9.

A coupling spring 26 bears at one end against the flange 23 of the sleeve 20 and at the other end against a shoulder of the hub of member 9. If the transmission is in the engaged position as shown in Fig. 7, the coupling spring 26 keeps the teeth of the coupling member 9 in engagement with the teeth of the coupling member 7. In this position the coupling disc 16, against which the coupling spring 26 is pressed by means of the flange 23 and the anti-friction disc 17, is maintained by the fork 13 in such a position that between the sleeve and the nuts 25 there is a small play of for example 1 millimeter. The purpose of this play is to assure that a sufficient pressure is exerted in order to maintain the teeth of the coupling members 7 and 9 in their engaged position, and to allow only a slight expansion of the spring 26.

The teeth 7a and 9a of the members 7 and 9 are of a type having inclined faces, and if the driven shaft 4 is subjected to too great a resistance, the inclined faces of the teeth 7a and 9a of the coupling members 7 and 9, respectively, slide along and onto each other, and at the same time shifting the hub of member 9 to the right (according to the drawing) against the action of the coupling spring 26. This displacement is possible since the pin 22 can move in the slot 21 of the sleeve 20. In this way the coupling disc 16 acts as a safety device.

In order to disengage the coupling 7, 9, the fork 13 is swung in the direction of the arrow A in Fig. 7. The unit consisting of the coupling disc 16, the anti-friction disc 17 and the sleeve 20, follows the displacement of the heads 14 of the fork 13 under the influence of the force exerted by the springs 26 and 19. As soon as the play between the end face of the sleeve 20 and the nut 25 has disappeared, the hub 9 is thereafter driven to the right, exclusively by the action of the disengaging spring 19, till it has reached the position shown in Fig. 8.

If it is desired to engage the coupling again, the fork 13 is turned in the direction of the arrow B in Fig. 8, so that at first the hub 9 and the sleeve 20 are shifted together to the left (according to Fig. 8), till the teeth of the coupling members 7 and 9 engage each other, and thereupon the sleeve 20 is displaced a little farther in order to take the position in which the coupling spring 26 is compressed with the required force.

Figure 9:
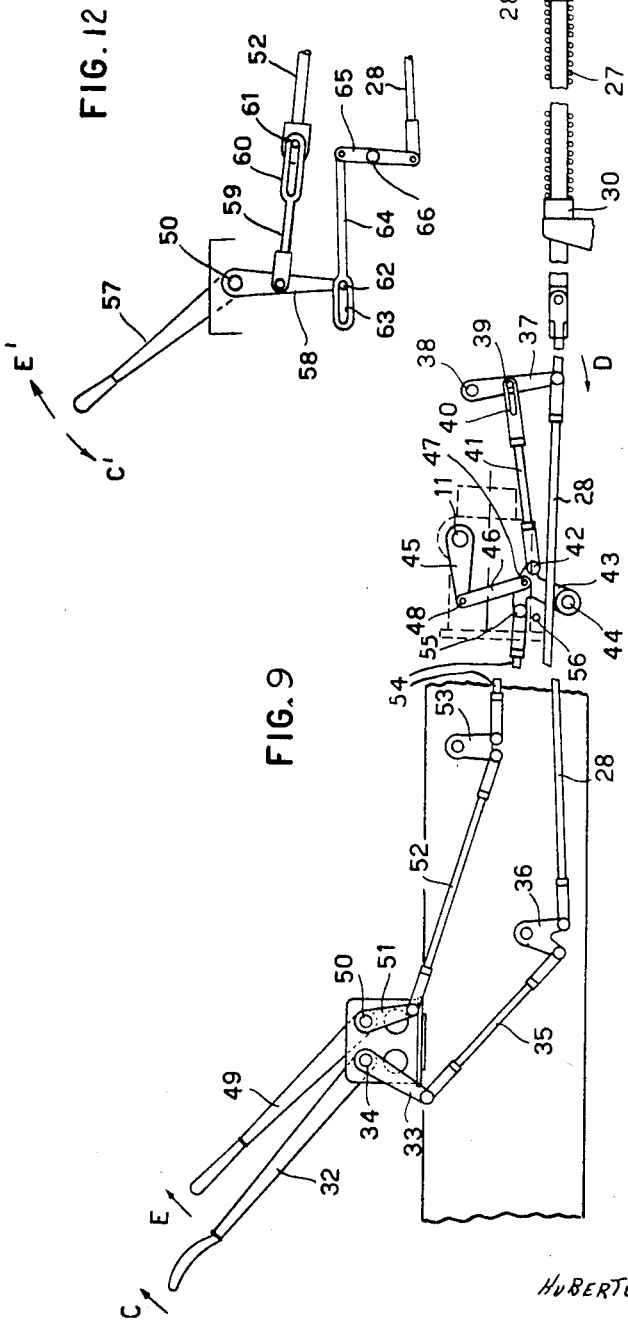
Fig. 9 is a schematic view of the operating controls arranged on the tractor, in the position in which the towing hook is locked.
Figure 10:
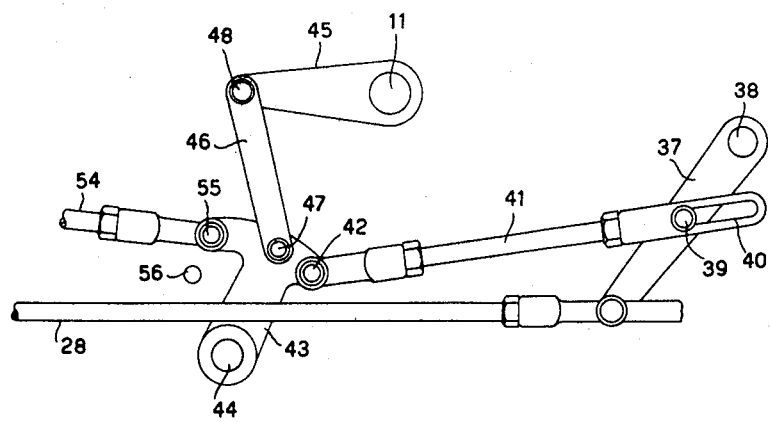
Fig. 10 is a portion of Fig. 9 on a larger scale in the position in which the towing hook is unlocked.

In the engaged position according to Fig. 7, the combined forces of the springs 19 and 26 act on the fork 13 and thereby on the shaft 11. In order to maintain the shaft 11 in this position it is of advantage to use a toggle-mechanism as shown in Fig. 9. This figure illustrates the several levers, rods and links of a vehicle of a special kind, a tractor for towing ordnance, ammunition wagons or other military vehicles, and which tractor is provided with a winch 101 which is driven by the above described transmission through shaft 4 and 102 and reduction gears 103. A towing hook 106 for hooking on the trail of a piece of ordnance, the pole of an ammunition wagon, etc. is fixed at the end of the winch cable 104. Circumstances may arise, especially on uneven ground, that it is necessary to displace or move the tractor independently of the gun. In this case the gun is left behind although it remains connected to the winch cable 104. The towing hook must then be unlocked and the drive of the winch must be disengaged in order to be able to reel out the cable. As soon as the tractor has arrived at a suitable place, the winch 101 must be actuated in order to pull the gun or the like towards the tractor until the towing hook 106 has reached its supporting member 109. Exactly at the same moment the drive of the winch has to be disengaged in order to prevent too great a stress in the cable. In the arrangement shown in Fig. 9 the spring acting on the pawl 112 is shown at 27. This spring acts by means of a rod 28 and a lever 29 on the pawl in the direction in which it locks the drawhook. This spring 27 is compressed between a fixed part 30 of the tractor and a collar 31 which is fixed to the rod 28.

In order to unlock the towing hook, a hand lever 32 is pulled in the direction of the arrow C so that by means of an arm 33 fixed on the shaft 34 of the lever 32 and by means of a rod 35 and a rocker 36 the rod 28 is pulled to the left. By this movement a lever 37 which is pivoted at 38 to the chassis, is pulled in the direction of the arrow D. A pin 39 is fixed at a point intermediate the pivot 38 and the free end of the lever 37. This pin 39 is movable in a slot 40 of a rod 41 which by a pivot 42 is connected to a rocker 43. The rocker 43 is turnable about a pivot 44. In this way a lost-motion connection is fixed between the rod 28 and the rocker 43.

The cross shaft 11 of the clutch described above which bears the operating fork 12, 13 also has an arm 45 which by means of a link 46 is connected to the rocker 43 by a pivot 47. The rocker 43 and the link 46 form a toggle-mechanism in that the connecting pivot 47 of these parts can pass the dead center which is formed by the connecting line between the pivot 44 and the pivot 48 connecting the arm 45 with the link 46.

A second hand lever 49 is supported by the vehicle chassis by means of a shaft 50. This shaft is, by means of an arm 51, a rod 52, a rocker 53 and a rod 54, connected to a pivot 55 of the rocker 43.

In Fig. 9 the rocker 43, the link 46 and the arm 45 are illustrated in the position of the shaft 11, which corresponds with Fig. 8, hence in the disengaged position of the clutch.

As stated before, for unlocking the towing hook 106 the lever 32 must be pulled in the direction of the arrow C, so that the lever 37 turns in the direction of the arrow D. During this movement the pin 39 moves in the slot 40 from the right to the left without displacing the rod 41. The clutch thus remaining in its disengaged position, the winch is free to unreel the cable. Forward movement of the entire tractor away from the towed object will unreel the cable from the winch.

Figure 11:
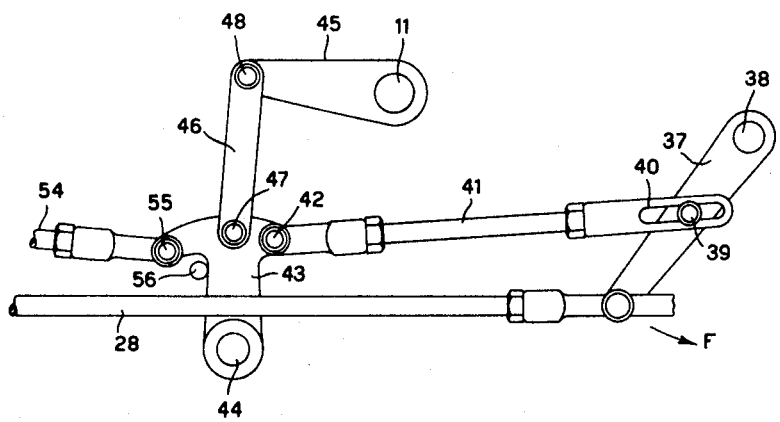
Fig. 11 is a view of the parts of Fig. 10, however, in the engaged position of the clutch for driving the winch of the tractor.

If it is now desired to drive the winch, the handlever 49 is pulled in the direction of the arrow E so that the rocker 43 is pulled to the left till this rocker, after passing the dead center 44—48, comes into contact with a fixed abutment 56. The amplitude of the movement to the left with relation to the dead center is smaller than the movement to the right, so that in the position at the left from the dead center the free end of the arm 45 is in a higher position than if the rocker 43 is turned to the right. This position corresponds with the engaged position of the clutch according to Fig. 7. The combined force of both springs 19 and 26 which acts on the fork 13, the operating member 12 and the shaft 11, maintains the toggle-mechanism 43, 46 in the position according to Fig. 11. If after a certain time the cable 104 is wound by the winch 101 and the towing hook 106 arrives in its supporting member 109, the projection 119 of the conical part 108 of the towing hook shifts the pin 115 so that the pawl 112 is unlocked. The lever 29 and the rod 28 are now free to be displaced to the right by means of the spring 27, and consequently the lever 37 is displaced in the direction of the arrow F according to Fig. 11. By this movement the pin 39 which is in the right hand part of the slot 40, pulls the rod 41 to the right so that the rocker 43 passes the dead center 44—48 and takes again the position according to Fig. 9. In this way the drive of the winch is disengaged at the same moment at which the towing hook arrives in its supporting member and is locked.

It is also possible to modify the lever and link system as shown in Fig. 12. In this alternative construction both levers 32 and 49 of Fig. 9 are combined in one lever 57 adapted to swing with its shaft 50. An arm 58 is fixed on the shaft 50 of lever 57 and is connected with the rod 52 by a link 59 provided with a slot 60 into which a pin 61 secured to the rod 52 is slidable, thus forming a lost-motion connection. The arm 58 is further provided with a pin 62 which is slidable in a slot 63 of a link 64, forming a second lost-motion connection which acts in a sense opposite to the first one. The link is connected to the rod 28 by means of a double arm lever 65 which is swingable about a pivot 66.

The lever 57 shown in Fig. 12 is in its intermediate or neutral position. If it is pulled in the direction of the arrow E' in the arm 58 is swung clockwise and pulls by means of the link 59 and the pin 61 the rod 52 to the left, while the pin 62 on the free end of the arm 58 slides in the slot 63, thus leaving the position of the rod 28 unchanged. If the lever 57 is pushed in opposite direction, thus in the direction of the arrow C', the arm 58 is swung counter-clockwise and pushes by pin 62 the link 64 to the right, so that the lever 65 swings about its pivot 66 and pulls the rod 28 to the left. During this movement the slot 60 of the link 59 slides along the pin 61 and the position of the rod 52 is left unchanged.

Having described my invention, what I claim is:

1. In a tractor having a motor, a winch operated by said motor, a cable on said winch having a towing hook with a shank, a seating member mounted on said tractor for seating said shank, a locking pawl in said seat cooperable with said shank and a spring loaded lever pivoted to said tractor urging said locking pawl to the locking position, that improvement comprising the combination of a clutch normally spring urged to the disengaged position, and linkage means between said clutch and said lever for locking said clutch in the engaged position and for starting movement of the clutch to the disengaged position, whereby when said shank seats in said seat said locking pawl is moved to the locking position and said linkage starts movement of said clutch to the disengaged position.

2. A combination as claimed in claim 1, said clutch comprising a driving shaft coupling means fixedly mounted on said shaft, a driven shaft coupling means engageable with the drive shaft coupling means slidably mounted on said driven shaft, a first spring means mounted on said driven shaft coupling means for urging said driven shaft coupling means into engagement with said driving shaft coupling means when under compression, a second spring means mounted for urging said driven shaft coupling means out of engagement with said driving shaft coupling means, and comprising means for compressing said second spring means for engaging said driving shaft and driven shaft coupling means and for further compressing said second spring means and for compressing said first spring means to hold said coupling means in the engaged position, said compressing means connected to said linkage means.

3. A combination as claimed in claim 1, said linkage means comprising a toggle mechanism, a first link connecting said lever and said toggle mechanism, a shaft operating said compressing means of said clutch, an arm mounted on said shaft, a second link connecting said arm to said toggle mechanism, a stop adjacent said toggle mechanism, whereby when the toggle mechanism is against said stop, the compressing means of said clutch is held in the compressed position and said clutch is engaged, and when said locking pawl is moved, said lever moves said first link and said toggle away from said stop through the dead center position of said toggle mechanism and said shaft is rotated until said compression means permits the driving and driven shafts of said clutch to disengage.

References Cited in the file of this patent

UNITED STATES PATENTS

| | | |
|---|---|---|
| 1,810,128 | Chapel | June 16, 1931 |
| 2,120,637 | Van Doorne | June 14, 1938 |
| 2,129,745 | Scammell et al. | Sept. 13, 1938 |
| 2,135,972 | Garlinger | Nov. 8, 1938 |
| 2,170,983 | Adams | Aug. 29, 1939 |
| 2,261,530 | Strickler, Jr. | Nov. 4, 1941 |